(12) United States Patent
Ma et al.

(10) Patent No.: US 11,397,590 B2
(45) Date of Patent: Jul. 26, 2022

(54) METHOD FOR PRELOADING APPLICATION, STORAGE MEDIUM, AND TERMINAL

(71) Applicant: Guangdong Oppo Mobile Telecommunications Corp., Ltd., Guangdong (CN)

(72) Inventors: Meirong Ma, Guangdong (CN); Yan Chen, Guangdong (CN); Yaoyong Liu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 638 days.

(21) Appl. No.: 16/390,383

(22) Filed: Apr. 22, 2019

(65) Prior Publication Data
US 2019/0347107 A1 Nov. 14, 2019

(30) Foreign Application Priority Data
May 10, 2018 (CN) .......................... 201810443194.0

(51) Int. Cl.
*G06F 9/00* (2006.01)
*G06F 9/445* (2018.01)
(Continued)

(52) U.S. Cl.
CPC ............ *G06F 9/445* (2013.01); *G06F 11/302* (2013.01); *G06F 11/34* (2013.01); *G06N 3/084* (2013.01); *H04L 67/303* (2013.01); *H04L 67/34* (2013.01)

(58) Field of Classification Search
CPC ....................................................... G06F 9/445
(Continued)

(56) References Cited

U.S. PATENT DOCUMENTS 7,747,749 B1 6/2010 Erikson et al.
8,812,658 B1 8/2014 Teeraparpwong et al.
(Continued)

FOREIGN PATENT DOCUMENTS

| CN | 102446096 A | 5/2012 |
| CN | 102541602 A | 7/2012 |

(Continued)

OTHER PUBLICATIONS

Android Tutorial, "Smoother loading of items", Jul. 22, 2016, pp. 1-4, [online][retrieved Dec. 14, 2021], Retrieved from <https://riptutorial.com/android/example/3155/smoother-loading-of-items>.*

(Continued)

*Primary Examiner* — Evral E Bodden
(74) *Attorney, Agent, or Firm* — Young Basile Hanlon & MacFarlane, P.C.

(57) ABSTRACT

A method for preloading an application, a storage medium, and a terminal are provided. The method includes the following. Current usage information of a terminal is acquired in response to detecting that an event of prediction of preloading an application is triggered. The current usage information is input to a model used for application prediction. The model used for application prediction includes a hybrid network model generated according to a usage rule of applications of the terminal corresponding to historical status feature information. At least one target application to be launched is predicted according to an output result of the model used for application prediction. The at least one target application is preloaded.

17 Claims, 7 Drawing Sheets

(51) Int. Cl.
  *G06F 11/30*    (2006.01)
  *G06F 11/34*    (2006.01)
  *G06N 3/08*    (2006.01)
  *H04L 67/303*    (2022.01)
  *H04L 67/00*    (2022.01)

(58) Field of Classification Search
  USPC ............................................................ 713/1
  See application file for complete search history.

(56) References Cited

U.S. PATENT DOCUMENTS

| | | |
|---|---|---|
| 9,448,708 B1 | 9/2016 | Bennett et al. |
| 9,513,888 B1 | 12/2016 | Fultz et al. |
| 9,557,889 B2 | 1/2017 | Raleigh et al. |
| 9,565,233 B1 | 2/2017 | Ozuysal et al. |
| 9,588,897 B2 | 3/2017 | Clausen et al. |
| 10,261,938 B1 | 4/2019 | Jenkins et al. |
| 10,459,887 B1 | 10/2019 | Dvortsov et al. |
| 2003/0220984 A1 | 11/2003 | Jones et al. |
| 2004/0030882 A1 | 2/2004 | Forman |
| 2004/0153445 A1 | 8/2004 | Horvitz et al. |
| 2005/0160352 A1 | 7/2005 | Chung et al. |
| 2005/0204198 A1 | 9/2005 | Pagan |
| 2007/0016480 A1 | 1/2007 | Lee |
| 2008/0005736 A1 | 1/2008 | Apacible et al. |
| 2009/0144396 A1 | 6/2009 | Walton |
| 2011/0090234 A1 | 4/2011 | Bolcsfoldi et al. |
| 2011/0292060 A1 | 12/2011 | Chambers et al. |
| 2011/0295830 A1 | 12/2011 | Swahn |
| 2012/0023226 A1 | 1/2012 | Petersen et al. |
| 2012/0105363 A1 | 5/2012 | Sirpal et al. |
| 2012/0117495 A1 | 5/2012 | Sirpal et al. |
| 2012/0167122 A1 | 6/2012 | Koskimies |
| 2012/0324481 A1 | 12/2012 | Xia et al. |
| 2013/0076597 A1 | 3/2013 | Becze |
| 2013/0173513 A1 | 7/2013 | Chu et al. |
| 2014/0075377 A1 | 3/2014 | Kang et al. |
| 2014/0173354 A1 | 6/2014 | Stanquist et al. |
| 2014/0184471 A1 | 7/2014 | Martynov et al. |
| 2014/0372356 A1* | 12/2014 | Bilal .................. G06F 9/44578 706/46 |
| 2014/0373032 A1 | 12/2014 | Merry et al. |
| 2015/0026415 A1 | 1/2015 | Clausen et al. |
| 2015/0293701 A1 | 10/2015 | Kim et al. |
| 2015/0324137 A1 | 11/2015 | Wu et al. |
| 2015/0355795 A1 | 12/2015 | Falkenburg et al. |
| 2016/0117716 A1 | 4/2016 | Lin et al. |
| 2016/0132344 A1 | 5/2016 | Funk et al. |
| 2016/0162148 A1 | 6/2016 | Murphy et al. |
| 2016/0189049 A1 | 6/2016 | Silvestri et al. |
| 2016/0203021 A1 | 7/2016 | Pike et al. |
| 2016/0246484 A1 | 8/2016 | Kim et al. |
| 2016/0357572 A1 | 12/2016 | Myrick et al. |
| 2016/0360336 A1 | 12/2016 | Gross et al. |
| 2016/0364272 A1 | 12/2016 | Hou et al. |
| 2017/0031690 A1 | 2/2017 | Ren |
| 2017/0046171 A1 | 2/2017 | Jung et al. |
| 2017/0185250 A1 | 6/2017 | Cho et al. |
| 2017/0195451 A1 | 7/2017 | Backholm |
| 2017/0344783 A1 | 11/2017 | Zhang et al. |
| 2018/0089105 A1 | 3/2018 | Bain et al. |
| 2018/0097905 A1 | 4/2018 | Todasco et al. |
| 2018/0217853 A1 | 8/2018 | Li et al. |
| 2018/0246635 A1 | 8/2018 | Baer et al. |
| 2018/0293087 A1 | 10/2018 | Lee et al. |
| 2019/0018565 A1 | 1/2019 | Lee et al. |
| 2019/0065240 A1 | 2/2019 | Kong et al. |
| 2019/0303176 A1 | 10/2019 | John |
| 2019/0342298 A1 | 11/2019 | Chen et al. |
| 2019/0361581 A1 | 11/2019 | Wang et al. |
| 2019/0372345 A1* | 12/2019 | Bain .................. G06Q 30/0601 |
| 2020/0342338 A1* | 10/2020 | Huang .................. G06F 9/44578 |
| 2020/0401418 A1 | 12/2020 | Regev et al. |
| 2021/0042622 A1* | 2/2021 | Sun .................. G08G 1/096816 |

FOREIGN PATENT DOCUMENTS

| | | |
|---|---|---|
| CN | 102819436 A | 12/2012 |
| CN | 102929532 A | 2/2013 |
| CN | 103092687 A | 5/2013 |
| CN | 103106000 A | 5/2013 |
| CN | 103246529 A | 8/2013 |
| CN | 103376974 A | 10/2013 |
| CN | 103412757 A | 11/2013 |
| CN | 103581754 A | 2/2014 |
| CN | 103593479 A | 2/2014 |
| CN | 103631612 A | 3/2014 |
| CN | 103677922 A | 3/2014 |
| CN | 104092821 A | 10/2014 |
| CN | 104298554 A | 1/2015 |
| CN | 104657183 A | 5/2015 |
| CN | 104809174 A | 7/2015 |
| CN | 104850799 A | 8/2015 |
| CN | 104951340 A | 9/2015 |
| CN | 105426214 A | 3/2016 |
| CN | 105431822 A | 3/2016 |
| CN | 105657522 A | 6/2016 |
| CN | 105682037 A | 6/2016 |
| CN | 105786839 A | 7/2016 |
| CN | 105824657 A | 8/2016 |
| CN | 105912215 A | 8/2016 |
| CN | 105912227 A | 8/2016 |
| CN | 105939416 A | 9/2016 |
| CN | 105955765 A | 9/2016 |
| CN | 106055369 A | 10/2016 |
| CN | 106056010 A | 10/2016 |
| CN | 106066805 A | 11/2016 |
| CN | 106201241 A | 12/2016 |
| CN | 106250988 A | 12/2016 |
| CN | 106325913 A | 1/2017 |
| CN | 106406966 A | 2/2017 |
| CN | 106569894 A | 4/2017 |
| CN | 106648733 A | 5/2017 |
| CN | 106648747 A | 5/2017 |
| CN | 106685851 A | 5/2017 |
| CN | 106775820 A | 5/2017 |
| CN | 106778248 A | 5/2017 |
| CN | 106874091 A | 6/2017 |
| CN | 106874095 A | 6/2017 |
| CN | 106919313 A | 7/2017 |
| CN | 106941672 A | 7/2017 |
| CN | 106959879 A | 7/2017 |
| CN | 107229397 A | 10/2017 |
| CN | 107249074 A | 10/2017 |
| CN | 107273011 A | 10/2017 |
| CN | 107368361 A | 11/2017 |
| CN | 107508961 A | 12/2017 |
| CN | 107562495 A | 1/2018 |
| CN | 107678799 A | 2/2018 |
| CN | 107678803 A | 2/2018 |
| CN | 107678823 A | 2/2018 |
| CN | 107728874 A | 2/2018 |
| CN | 107729133 A | 2/2018 |
| CN | 107748685 A | 3/2018 |
| CN | 107748686 A | 3/2018 |
| CN | 107766201 A | 3/2018 |
| CN | 107783801 A | 3/2018 |
| CN | 107833073 A | 3/2018 |
| CN | 107872523 A | 4/2018 |
| CN | 107885591 A | 4/2018 |
| CN | 107943650 A | 4/2018 |
| CN | 107944259 A | 4/2018 |
| CN | 108076224 A | 5/2018 |
| CN | 108572965 A | 9/2018 |
| CN | 108595224 A | 9/2018 |
| CN | 108595228 A | 9/2018 |
| CN | 108595231 A | 9/2018 |
| CN | 108614722 A | 10/2018 |
| CN | 108647052 A | 10/2018 |
| CN | 108647056 A | 10/2018 |
| CN | 108710513 A | 10/2018 |
| CN | 108762831 A | 11/2018 |
| CN | 108762843 A | 11/2018 |
| CN | 108804157 A | 11/2018 |

(56) References Cited

FOREIGN PATENT DOCUMENTS

| | | |
|---|---|---|
| CN | 108829456 A | 11/2018 |
| CN | 108829457 A | 11/2018 |
| CN | 108920156 A | 11/2018 |
| EP | 1242880 A2 | 9/2002 |
| EP | 3486769 A1 | 5/2019 |
| WO | 03054696 A1 | 7/2003 |
| WO | 2013073908 A1 | 5/2013 |
| WO | 2015169188 A1 | 11/2015 |
| WO | 2017057912 A1 | 4/2017 |
| WO | 2018055506 A1 | 3/2018 |
| WO | 2018161812 A1 | 9/2018 |
| WO | 2019171237 A1 | 9/2019 |

OTHER PUBLICATIONS

Extended European Search Report for EP Application 18212560.9 dated May 23, 2019. (9 pages).
China First Office Action with English Translation for CN Application 201711340000.6 dated Nov. 29, 2019. (11 pages).
China Second Office Action with English Translation for CN Application 201711340000.6 dated Mar. 25, 2020. (20 pages).
China Third Office Action with English Translation for CN Application 201711340000.6 dated Jul. 7, 2020. (8 pages).
China Decision to Refuse with English Translation for CN Application 201711340000.6 dated Nov. 4, 2020. (14 pages).
India Examination Report for IN Application 201814047359 dated Mar. 22, 2021. (7 pages).
U.S. Non-Final Office Action U.S. Appl. No. 16/220,601 dated Jul. 8, 2020. (38 pages).
U.S. Final Office Action for U.S. Appl. No. 16/220,601 dated Jan. 19, 2021. (26 pages).
International Search Report for International Application PCT/CN2018/121309 dated Mar. 14, 2019. (11 pages).
China First Office Action with English Translation for CN Application 201810530136.1 dated Mar. 20, 2020. (29 pages).
China Second Office Action with English Translation for CN Application 201810530136.1 dated Sep. 30, 2020. (21 pages).
China Third Office Action with English Translation for CN Application 201810530136.1 dated Apr. 2, 2021. (21 pages).
Extended European Search Report for EP Application 19169146.8 dated Nov. 12, 2019. (8 pages).
India Office Action for IN Application 201914014288 dated Mar. 22, 2021. (7 pages).
International Search Report for International Application PCT/CN2019/082303 dated Jul. 12, 2019. (10 pages).
China First Office Action with English Translation for CN Application 201810532749.9 dated Mar. 2, 2020. (15 pages).
Extended European Search Report for EP Application 19162115.0 dated Sep. 27, 2019. (10 pages).
International Search Report for International Application PCT/CN2019/076755 dated May 10, 2019. (10 pages).
China First Office Action with English Translation for CN Application 201810532722.X dated Sep. 23, 2019. (11 pages).
China Notice of Allowance with English Translation for CN Application 201810532722.X dated Mar. 25, 2020. (12 pages).
India Examination Report for IN Application 201914019649 dated Nov. 27, 2020. (6 pages).
U.S. Non-Final Office Action for U.S. Appl. No. 16/290,190 dated Mar. 5, 2020. (37 pages).
International Search Report for International Application PCT/CN2019/085900 dated Aug. 1, 2019. (10 pages).
Hong Cao et al., Mining Smartphone data for app usage prediction and recommendations: A Survey, Pervasive and Mobile Computing, Jan. 2017. (22 pages).
European Examination Report for EP Application 19173437.5 dated Nov. 2, 2020. (5 pages).
European Examination Report for EP Application 19171005.2 dated Mar. 24, 2021. (6 pages).
India Examination Report for IN Application 201914016637 dated Feb. 8, 2021. (7 pages).
China First Office Action with English Translation for CN Application 201810442588.4 dated Mar. 29, 2019. (25 pages).
China Second Office Action with English Translation for CN Application 201810442588.4 dated Oct. 15, 2019. (18 pages).
China Third Office Action with English Translation for CN Application 201810442588.4 dated May 18, 2020. (15 pages).
Extended European Search Report for EP Application 19171253.8 dated Sep. 30, 2019. (7 pages).
India First Examination Report for IN Application 201914017025 dated Jan. 27, 2021. (7 pages).
US Third Party Submission for U.S. Appl. No. 16/397,521 mailed May 11, 2020. (15 pages).
U.S. Non-Final Office Action for U.S. Appl. No. 16/397,521 dated Feb. 16, 2021. (36 pages).
International Search Report for International Application PCT/CN2019/083256 dated Jun. 14, 2019. (11 pages).
China First Office Action with English translation for CN Application 201810463427.3 dated Feb. 3, 2020. (13 pages).
Abhinav Parate et al., Practical Prediction and Prefetch for Faster Access to Applications on Mobile phones, UbiComp'13, Sep. 8-12, 2013. (11 pages).
Extended European Search Report for EP Application 19173437.5 dated Oct. 14, 2019. (8 pages).
Examination report issued in corresponding European application No. 19173437.5 dated Nov. 2, 2020.
International Search Report for International Application PCT/CN2019/084999 dated Jul. 25, 2019. (10 pages).
China First Office Action with English Translation for CN Application 201810578120.8 dated Nov. 30, 2020. (19 pages).
Extended European Search Report for EP Application 19176708.6 dated Nov. 5, 2019. (8 pages).
European Examination Report for EP Application 19176708.6 dated Jun. 23, 2020. (5 pages).
India Examination Report for IN Application 201914022209 dated Sep. 30, 2020. (6 pages).
International Search Report for International Application PCT/CN2019/089685 dated Aug. 28, 2019. (10 pages).
China First Office Action with English Translation for CN Application 201810400917.9 dated Aug. 28, 2019. (29 pages).
China Second Office Action with English Translation for CN Application 201810400917.9 dated Nov. 7, 2019. (28 pages).
China Third Office Action with English Translation for CN Application 201810400917.9 dated Jan. 17, 2020. (32 pages).
China Decision to Refuse with English Translation for CN Application 201810400917.9 dated Apr. 20, 2020. (47 pages).
Extended European search report issued in corresponding European application No. 19171005.2 dated Oct. 10, 2019.
Dao Hong et al: "Mining smartphone data for app usage prediction and recommendations: A survey", Pervasive and Mobile Computing, Elsevier, NL, vol. 37, Jan. 20, 2017 (Jan. 20, 2017), pp. 1-22, XP029961029, ISSN: 1574-1192, DOI: 10.1016/J.PMCJ.2017.01.007 the whole document.
Tingxin Yan et al: "Fast app launching for mobile devices using predictive user context", MOBISYS 2012: 10th International Conference on Mobile Systems, Applications and Services, Jun. 25, 2012 (Jun. 25, 2012), p. 113, XP055106616, DOI: 10.1145/2307636.2307648 ISBN: 978-1-45-031301-8 the whole document.
Ricardo Baeza-Yates et al: "Predicting The Next App That You Are Going To Use", Web Search and Data Mining, ACM, 2 Penn Plaza, Suite 701 New York NY 10121-0701 USA, Feb. 2, 2015 (Feb. 2, 2015), pp. 285-294, XP058065486, DOI: 10.1145/2684822.2685302 ISBN: 978-1-4503-3317-7 the whole document.
International Search Report for International Application PCT/CN2019/084218 dated Jul. 31, 2019. (17 pages).
China First Office Action with English Translation for CN Application 201810531573.5 dated Oct. 29, 2020. (18 pages).
Partial European Search Report for EP Application 19173778.2 dated Oct. 11, 2019. (15 pages).
Android Developers, Multi-Window Support mailed May 19, 2018. (13 pages).

(56) References Cited

OTHER PUBLICATIONS

Extended European Search Report for EP Application 19173778.2 dated Jan. 29, 2020. (14 pages).
India Examination Report for IN Application 201914018510 dated Jan. 27, 2021. (5 pages).
U.S. Non-Final Office Action for U.S. Appl. No. 16/394,768 dated Feb. 19, 2021. (41 pages).
International Search Report for International Application PCT/CN2019/083479 dated Jun. 27, 2019. (10 pages).
Notice Of Allowance for U.S. Appl. No. 16/397,521 dated Apr. 15, 2021. (12 pages).
Android Developer, Handle Activity State Changes mailed Nov. 7-8, 2018. (6 pages).
Android Developer, Understandi the Activity Lifecycle mailed May 8, 2018. (29 pages).
China Second Office Action with English Translation for CN Application 201810443981.5 dated Aug. 3, 2020. (16 pages).
Third Office Action with English Translation for CN Application 201810443981.5 dated Nov. 16, 2020. (18 pages).
Extended European Search Report for EP Application 19173310.4 dated Oct. 11, 2019. (8 pages).
India Examination Report for IN Application 201914018092 dated Feb. 8, 2021. (5 pages).
International Search Report for International Application PCT/CN2019/085347 dated Aug. 12, 2019. (10 pages).
India First Examination Report for IN Application 201914016637 dated Feb. 8, 2021. (7 pages).
European Examination Report for EP Application No. 19171005.2 dated Mar. 24, 2021. (6 pages).
Extended European Search Report for EP Application 19793314.6 dated Apr. 20, 2021. (9 pages).
Third Party Submission for U.S. Appl. No. 16/290,190 mailed May 27, 2020. (21 pages).
English translation of second office action issued in corresponding CN application No. 201810443194.0 dated Mar. 25, 2020.
International search report issued in corresponding international application No. PCT/CN2019/083230 dated Jun. 17, 2019.
Communication pursuant to Article 94(3) EPC issued in corresponding European application No. 19171005.2 dated Aug. 28, 2020.
English Translation of the rejection issued in corresponding CN application No. 201810443194.0 dated Jul. 9, 2020.
English Translation of the first office action issued in corresponding CN application No. 201810443194.0 dated Dec. 11, 2019.
Yujia Yang, Zhejiang University Master Thesis, Chapter 3. Behavioral Pattern Mining for Mobile Applications, Jun. 16, 2016. (11 pages).
Neural network for time series forecasting, http://blog.sina.com.en/s/blog_4dd4d3a5010009z9.html, Sep. 13, 2007. (6 pages).
Smoother loading of items, Available at:https://riptutorial.com/android/example/3155/smoother-loading-of-items, 4 pages.

* cited by examiner

METHOD FOR PRELOADING APPLICATION, STORAGE MEDIUM, AND TERMINAL

CROSS-REFERENCE TO RELATED APPLICATION(S)

The present disclosure claims priority to Chinese Patent Application No. 201810443194.0, filed May 10, 2018, the entire disclosure of which is hereby incorporated by reference.

TECHNICAL FIELD

The present disclosure relates to the technical field of machine learning, and particularly to a method for preloading an application, a storage medium, and a terminal.

BACKGROUND

Currently, with the rapid development of intelligent terminal technologies, smart devices such as smart phones, tablet computers, and smart televisions have become indispensable electronic devices in people's life.

Various applications (application software, APP) are installed on the intelligent terminal. Generally, an application starts to be loaded in response to user operation for opening the application. Time of loading applications increases with increase of storage space occupied by the applications, thereby wasting user time. In order to make some applications run more smoothly, some intelligent terminals may prepare resources for loading the applications in advance, that is, preload the applications in advance.

However, the applications cannot be preloaded at will, because when too many resources are preloaded, too much storage space are taken up, and power consumption increases, thereby affecting fluency of usage of the terminal. Therefore, it is important to optimize a mechanism for preloading and reduce the power consumption of the terminal.

SUMMARY

Implementations of the present disclosure provide a method for preloading an application, a storage medium, and a terminal, which can optimize a solution for preloading applications of the terminal.

According to a first aspect of the implementations of the present disclosure, a method for preloading an application is provided.

Current usage information of a terminal is acquired in response to detecting that an event of prediction of preloading an application is triggered. The current usage information is input to a model used for application prediction. The model used for application prediction includes a hybrid network model generated according to a usage rule of applications of the terminal corresponding to historical status feature information. At least one target application to be launched is predicted according to an output result of the model used for application prediction. The at least one target application is preloaded.

According to a second aspect of the implementations of the present disclosure, a computer readable storage medium is provided. The computer readable storage medium is configured to store computer programs which, when executed by a processor, are operable with the processor to execute the method for preloading an application provided in the first aspect of the implementations of the disclosure.

According to a third aspect of the implementations of the present disclosure, a terminal is provided. The terminal includes a processor, a memory, and computer programs. The computer programs are stored in the memory and operable with the processor. The processor is configured to execute the computer programs to implement the method for preloading an application provided in the first aspect of the implementations of the present disclosure.

DETAILED DESCRIPTION

Figure 1:
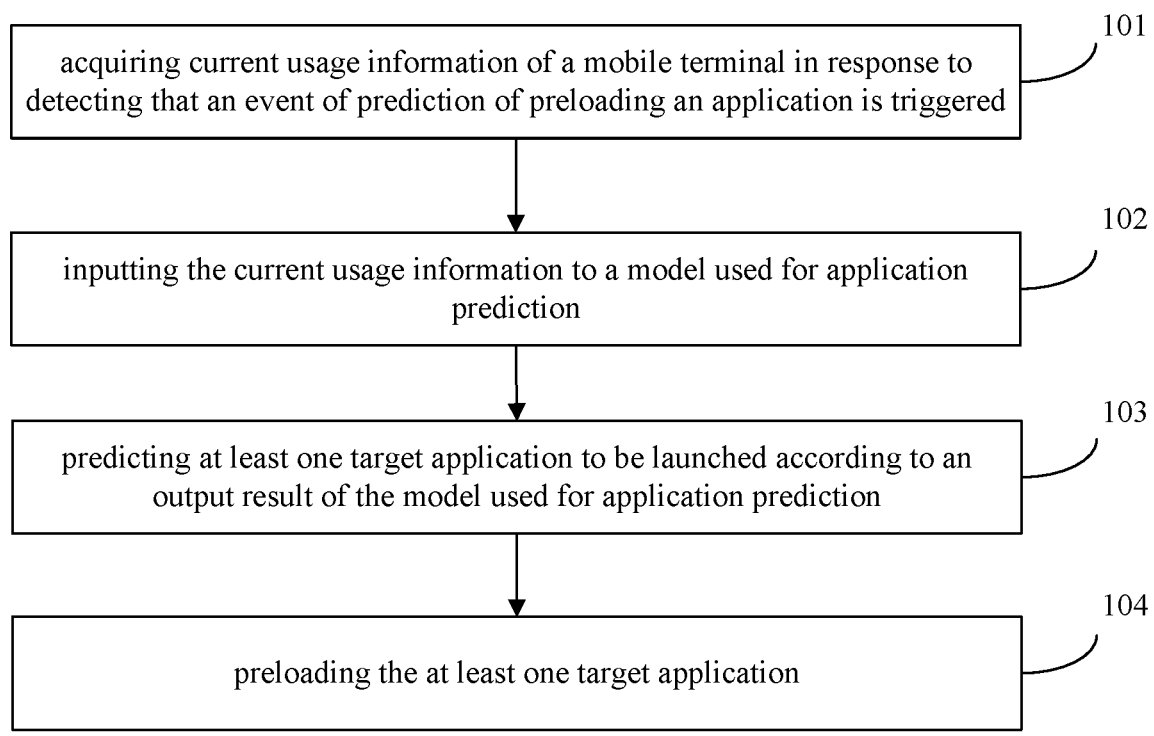
FIG. 1 is a flow chart illustrating a method for preloading an application according to an implementation of the present disclosure.

Technical solutions of the present disclosure will be further described below through implementations with reference to the accompanying drawings. It will be appreciated that the implementations are described herein for the purpose of explaining the disclosure rather than limiting the disclosure. In addition, it should also be noted that for the convenience of description, only part of rather than all structures related to the present disclosure are illustrated in the accompanying drawings.

Before discussing the exemplary implementations in more detail, what needs to be illustrated is that some exemplary implementations are described as processes or methods of a flowchart. In the flowchart, although each step is depicted as being processed sequentially, some of these steps may be performed in parallel, concurrently, or simultaneously. In addition, the order of the steps can be rearranged. The process of one step may be terminated when a corresponding operation is completed, but the implementations may also have additional steps that are not illustrated in the accompanying drawings. The process may correspond to a method, a function, a protocol, a subroutine, a subprogram, and the like.

For a terminal device, preloading an application is a method frequently employed to improve user experience. Preparing resources for loading some applications in advance can enable the applications to run more smoothly.

In the related art, an application is preloaded mainly based on a statistical method. For example, several applications may be used most and are all preloaded; or applications are scored and ranked according to usage habits, and applications with a high rank are preloaded. However, information of correlation between applications, time information as well as status information of the terminal and the like are not taken into consideration in the method above, which results in that applications to be preloaded cannot be accurately predicted, and too many resources are preloaded. If only one application may be actually used at next time, user experience may be affected if too many resources are preloaded. Therefore, it is important to accurately predict at least one application to be launched at next time.

According to an implementation of the present disclosure, a method for preloading an application is provided. The method includes the following. Current usage information of a terminal is acquired in response to detecting that an event of prediction of preloading an application is triggered. The current usage information is input to a model used for application prediction, where the model used for application prediction includes a hybrid network model generated according to a usage rule of applications of the terminal corresponding to historical status feature information of the terminal. At least one target application to be launched is predicted according to an output result of the model used for application prediction. The at least one target application is preloaded.

In the implementation, the current usage information includes a sequence associated with usage timing of a running application of the terminal and current status feature information of the terminal, and the sequence associated with the usage timing of the running application at least indicates an application running prior to the running application.

In the implementation, the method further includes forming the hybrid network model based on a fully connected relation between an output layer of a recurrent-neural-network submodel and an output layer of a fully connected network submodel.

In the implementation, the method further comprises inputting the sequence associated with the usage timing of the running application to the recurrent-neural-network submodel, and inputting the current status feature information of the terminal to the fully connected network submodel.

In the implementation, the method further includes the following. Historical sample usage information of the terminal during a preset period is acquired, where the historical sample usage information includes a sequence associated with historical usage timing of at least two applications of the terminal, and historical status feature information of the terminal corresponding to a time point of launching each of the at least two applications. The sequence associated with the historical usage timing of the at least two applications is input to the recurrent-neural-network submodel, and the historical status feature information is input to the fully-connected-network submodel, so as to train the hybrid network model to acquire the model used for application prediction.

In the implementation, the at least one target application is preloaded as follows. An active window stack for preloading is created, where the active window stack for preloading has boundary coordinates locating outside a coordinate range of a display screen. An application interface of the at least one target application according to the active window stack for preloading.

In the implementation, the method further includes the following. Whether an operation of opening a preset code path corresponding to the running application is detected is determined. Preloading the at least one target application is paused in response to that the operation of opening the preset code path is detected.

In the implementation, the at least one target application is preloaded as follows. A central processing unit (CPU) usage rate of the terminal is acquired, and the at least one target application is preloaded when the CPU usage rate is lower than a preset usage rate threshold. Or, a value of remaining storage space of the terminal is acquired, and the at least one target application is preloaded when the value of the remaining storage space is larger than a preset storage threshold.

In the implementation, the status feature information includes at least one of the following: time information, date category, on and off status of a mobile data network, wireless hotspot connection status, identity information of a connected wireless hotspot, duration of that the current application stays in the background, time of last switch of the current application to the background, plugging and unplugging status of an earphone jack, charging status, power information of a battery, display duration of a screen, motion status of the terminal, and location information of the terminal.

According to an implementation of the present disclosure, a terminal is provided. The terminal includes at least one processor, a computer readable memory, coupled to the at least one processor and storing at least one computer executable instruction therein, which when executed by the at least one processor, cause the at least one processor to carry out the following actions. Current usage information of the terminal is acquired in response to detecting that an event of prediction of preloading an application is triggered. The current usage information is input to a model used for application prediction, where the model used for application prediction includes a hybrid network model generated according to a usage rule of applications of the terminal corresponding to historical status feature information of the terminal. At least one target application to be launched is predicted according to an output result of the model used for application prediction. The at least one target application is preloaded.

According to an implementation of the present disclosure, a non-transitory computer-readable storage medium is provided. The storage medium stores at least one computer-executable instruction which, when executed by at least one processor, causes the at least one processor to carry out the following actions. Current usage information of a terminal is acquired in response to detecting that an event of prediction of preloading an application is triggered. The current usage information is input to a model used for application prediction, where the model used for application prediction includes a hybrid network model generated according to a usage rule of applications of the terminal corresponding to historical status feature information of the terminal. At least one target application to be launched is predicted according to an output result of the model used for application prediction. The at least one target application is preloaded.

FIG. 1 is a schematic flow chart illustrating a method for preloading an application according to an implementation of the present disclosure. The method can be implemented by a terminal such as a phone, a tablet computer, a notebook computer, a smart home appliance or the like. As illustrated in FIG. 1, the method begins at block 101.

At block 101, current usage information of the terminal is acquired in response to detecting that an event of prediction of preloading an application is triggered.

The current usage information includes a sequence associated with usage timing of a current application (i.e., a running application) and current status feature information of the terminal.

In the implementation of the present disclosure, the current usage information of the terminal is acquired in response to detecting that the event of prediction of preloading an application is triggered, such that a control of preloading an application is executed.

In an implementation, when it is detected that a new application is opened, that is, when an operation for switching a foreground application is detected, the event of prediction of preloading an application is triggered. When a permission for prediction of preloading an application is opened in response to user click, it represents that the event of prediction of preloading an application is triggered. What needs to be illustrated is that detailed conditions representing that the event of prediction of preloading an application is triggered are not limited in the implementations of the present disclosure.

A sequence associated with usage timing includes timing relationship of usage of each application, and it is to be understood that the sequence associated with the usage timing of the current application may include a sequence associated with previous usage of the current application. In an implementation, an application currently used is an application A, an application running at last time is an application B, and an application running prior to the application B is an application C. It can be understood that a running application is first switched to the application B from the application C, and is then switched to the application A from the application B, so the sequence associated with the usage timing of the current application can be represented as: application C→application B→application A. What needs to be illustrated is that the number of applications contained in the sequence associated with the usage timing of the current application is not limited in the implementations of the present disclosure. The applications contained in the sequence associated with the usage timing of the current application may only include the current application, or may include the current application and an application running prior to the current application, or may also be a sequence of switching multiple applications. The current status feature information of the terminal may include at least one of the following: time information, date category, on and off status of a mobile data network, wireless hotspot connection status, identity information of a connected wireless hotspot, duration of that the current application stays in the background, time of last switch of the current application to the background, plugging and unplugging status of an earphone jack, charging status, power information of a battery, display duration of a screen, motion status of the terminal, and location information of the terminal.

The time information can be understood as a period that the terminal is currently in. For example, the time information may include morning peak, noon, evening peak, working time, and rest time. Certainly, the time information may also include equal divisions of twenty-four hours from 0:00 to 24:00 of a day. For example, the twenty-four hours of a day may be divided into six periods each having four hours. The time information may be recorded in the form of timestamp. The date category may include weekday and holiday, and the date category may also be recorded in the form of timestamp. The on and off status of the mobile data network may include the on status in which the mobile data network is on and the off status in which the mobile data network is off. It can be understood that the terminal can perform a series of online operations such as web browsing through the mobile data network when the mobile data network is in the on status; the terminal cannot perform web browsing and other operations through the mobile data network when the mobile data network is in the off status. The wireless hotspot connection status may include status of being connected to a wireless hotspot and status of being disconnected from a wireless hotspot. When being connected to a wireless hotspot, the status feature information may further include identity information of the connected wireless hotspot. The identity information of the connected wireless hotspot may include a service set identifier (SSID) and a basic service set identifier (BSSID). The duration of that the current application stays in the background can be understood as duration from the time that the application is switched to the background to the time that the application is completely cleared from the background. Duration from the time of the last switch of the current application to the background to the current time can be determined according to the time of the last switch of the current application to the background. The plugging and unplugging status of the earphone jack can be understood as that the terminal is connected with an earphone or the terminal is disconnected from the earphone. The charging status may include whether the terminal is in a charging mode. The charging status may also include a charging mode type when the terminal is in the charging mode. The charging mode type may include a fast charging mode and a normal charging mode. The terminal in the fast charging mode can be charged by a fast charging power adapter (such as portable power), and the terminal in the normal charging mode can be charged by a normal power adapter (such as an original charger of the terminal). The power information of the battery can be understood as current remaining battery capacity of the terminal. The display duration of the screen can be understood as duration of the last light up of the screen. The motion status can include a current speed and/or a current accelerated speed of the terminal. The location information can be understood as a specific location where the terminal locates at current time, and the location information may include a name of a province, a city, a district, and a country, and may even include a specific name of a street, a building, and the like.

At block 102, the current usage information is input to a model used for application prediction.

The model used for application prediction includes a hybrid network model generated according to a usage rule of applications of the terminal corresponding to historical status feature information.

The model used for application prediction can be understood as a learning model which quickly determines at least one target application to be launched after the current usage information is input. The model used for application prediction may be the hybrid network model generated according to the usage rule of the applications of the terminal corresponding to the historical status feature information. That is, the usage rule of the applications of the terminal corresponding to the historical status feature information is adopted as a training sample. The training sample is trained and learned according to the hybrid network model to generate the model used for application prediction.

In an implementation, the hybrid network model includes a hybrid model constructed by at least two different machine learning models. In an implementation, the hybrid network model includes a recurrent-neural-network submodel and a fully connected network submodel constructed according to a fully connected layer. The hybrid network model is formed by an output layer of the recurrent-neural-network submodel and an output layer of the fully connected network submodel according to a fully connected relation. What needs to be illustrated is that structures and compositions of the hybrid network model are not limited in the implementation of the present disclosure.

At block 103, at least one target application to be launched is predicted according to an output result of the model used for application prediction.

In the implementation of the present disclosure, the at least one target application to be launched is predicted according to the output result of the model used for application prediction. It can be understood that after the current usage information is input to the model used for application prediction, the model used for application prediction analyzes the current usage information and determines the at least one target application to be launched according to an analysis result. In an implementation, a probability value of launching each application output by the model used for application prediction is acquired after the current usage information is input to the model used for application prediction. N probability values larger than a preset value are selected from the probability values acquired, where N is an integer larger than or equal to one. Applications each corresponding to one of the N probability values selected are determined as target applications to be launched. In an implementation, an application corresponding to a largest probability value in all the probability values is determined as the at least one target application to be launched. In an implementation, two applications each corresponding to one of two probability values larger than the preset value are determined as the target applications to be launched.

In an implementation, the N probability values can be selected from the probability values acquired as follows. Storage space information of the terminal is acquired, and N is determined according to the storage space information. The N probability values are selected from the probability values acquired. In this way, the number of the target applications to be launched can be determined according to the storage space information of the terminal, and the applications to be launched are preloaded under the premise of ensuring that an occupancy rate of system resource is not affected, thereby further improving fluency of using the application to improve user experience.

The storage space information of the terminal may include a size of remaining storage space of the terminal at the current time, and may also include an occupancy rate of the storage space of the terminal at the current time. It can be understood that the storage space information reflects a size of available storage space of the terminal at the current time. The larger the remaining storage space, the larger available storage space of the terminal, and the more the target applications that can be loaded. Similarly, the lower the storage space occupancy rate, the larger the available storage space of the terminal, and the more the target applications that can be loaded. N is determined according to the storage space information. N can be set to be large when the available storage space of the terminal is determined to be large according to the storage space information. N can be set to be small when the available storage space of the terminal is determined to be small according to the storage space information. The N probability value can be selected from the probability values acquired, and the applications each corresponding to one of the N probability values are determined as the target applications to be launched.

At block 104, the at least one target application is preloaded.

Specific processes of preloading and loaded data resources are not limited in the implementations of the present disclosure. In an implementation, corresponding hardware resources can be allocated to the at least one target application, and related data required for launching can be loaded according to the allocated hardware resources. In addition, the loaded data resources can be determined according to the specific type of the target application. For example, when the target application is a social application, a launching screen, a contact list, and a recent message record of the application can be preloaded; when the target application is a game application, game background related data of the application and the like can be preloaded.

After the target application is preloaded, if the target application is really needed by the user, the target application may be launched in response to triggering (for example, in response to click of an application icon corresponding to the target application). At this point, since all or part of resources for launching are preloaded, a speed of launching the target application can be increased, and user waiting time is reduced, thereby increasing usage efficiency and improving fluency of using the target application during usage of the target application.

According to the method for preloading an application provided in the implementation of the present disclosure, the current usage information of the terminal is acquired in response to detecting that the event of prediction of preloading an application is triggered. The current usage information includes the sequence associated with the usage timing of the current application and the current status feature information of the terminal. The current usage information is input to the model used for application prediction. The model used for application prediction includes the hybrid network model generated according to the usage rule of the applications of the terminal corresponding to the historical status feature information. The at least one target application to be launched is predicted according to the output result of the model used for application prediction. The target application is preloaded. Furthermore, by means of the above technical solution, technical problems are solved, such as that too many resources are preloaded for applications, too many resources are occupied by preloading an application, power consumption is increased, and fluency of usage of the terminal is affected. Furthermore, by adopting the hybrid network model, accuracy of prediction of the at least one application to be launched is increased, system power consumption of the terminal and an occupation rate of a memory of the terminal are further reduced, thereby optimizing a mechanism for preloading an application.

In some implementations, the hybrid network model includes the recurrent-neural-network submodel and the fully connected network submodel constructed according to a fully connected layer. The output layer of the recurrent-neural-network submodel and the output layer of the fully connected network submodel forms the hybrid network model according to the fully connected relation. Correspondingly, the current usage information is input to the model used for application prediction as follows. The sequence associated with the usage timing of the current application is input to the recurrent-neural-network submodel, and the current status feature information is input to the fully-connected-network submodel. In this way, the accuracy of the prediction of the at least one application to be launched can be further increased through the hybrid network model constructed by the recurrent-neural-network submodel and the fully connected network submodel.

Figure 2:
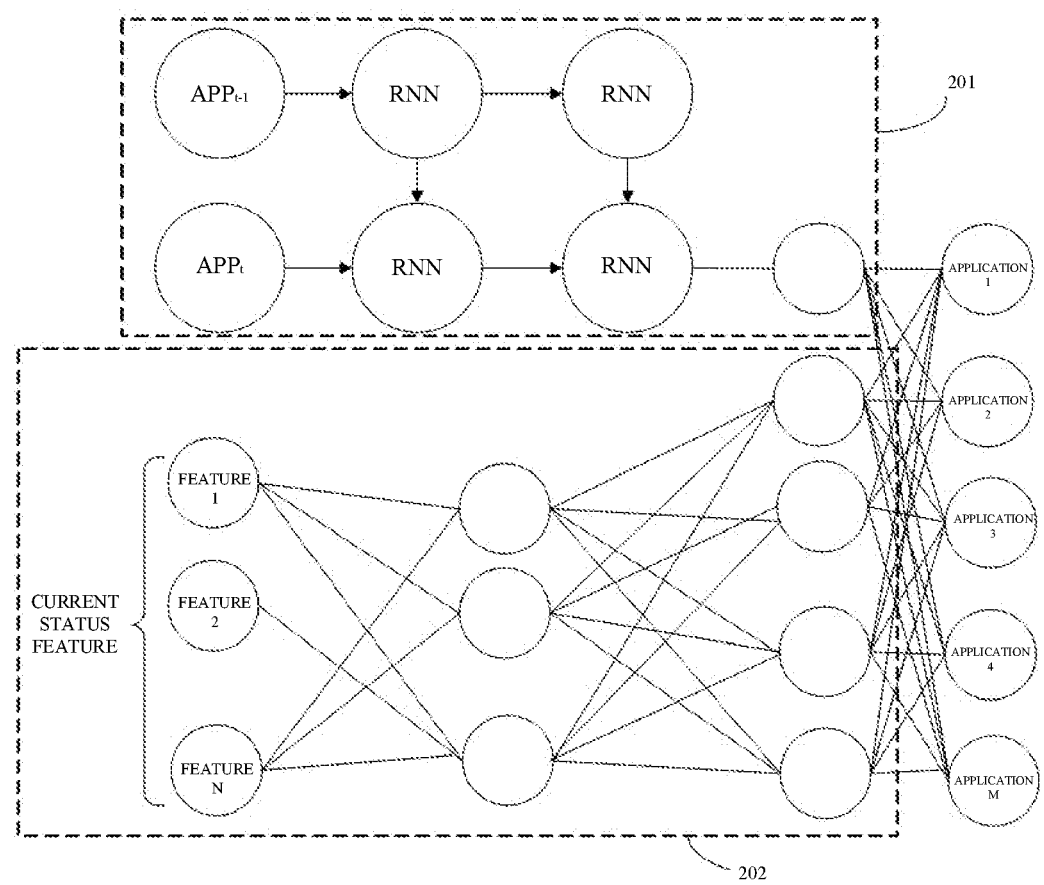
FIG. 2 is a schematic structural diagram illustrating a hybrid network model according to an implementation of the present disclosure.

In an implementation, the sequence associated with the usage timing of the current application in the current usage information includes: $APP_{t-1} \rightarrow APP_t$, and the current status feature information of the terminal includes: {feature 1, feature 2, ..., feature n}. It can be understood that the $APP_t$ represents an application currently in use, the $APP_{t-1}$ represents an application running prior to the current application $APP_t$, that is, an application running at last time is the $APP_{t-1}$, and the running application is switched from the application $APP_{t-1}$ running at last time to the current application $APP_t$. The current status feature information of the terminal contains n features. FIG. 2 is a schematic structural diagram illustrating a hybrid network model according to an implementation of the present disclosure. As illustrated in FIG. 2, the sequence associated with the usage timing of the current application, $APP_{t-1} \rightarrow APP_t$, is input to a recurrent-neural-network submodel 201 in the hybrid network model, and the current status feature information, {feature 1, feature 2, ..., feature n}, is input to a fully connected network submodel 202 in the hybrid network model. The hybrid network model analyzes the current usage information to predict the at least one target application to be launched. When M applications are involved in a sequence associated with historical usage timing used in training of the hybrid network model, an output layer of the hybrid network model contains M output results, that is, the output layer outputs a probability value of launching each of the M applications. From the M output results, N applications are determined as the target applications to be launched, where M is an integer larger than or equal to 2, and N is an integer larger than or equal to 1, and smaller than or equal to M.

In the implementation, $APP_t$ can be represented in the form of one-hot code. In an implementation, the M applications are involved in the sequence associated with the historical usage timing, and for convenience, the M applications are represented by 1, 2, ..., M, respectively. For example, if M is 10, an application 5 is in use at the time t, a code vector corresponding to the application APP used at the time t is [0,0,0,0,1,0,0,0,0,0], that is, only a value at a position of a sequence number 5 is 1, and the rest are all 0.

In some implementations, before it is detected that the event of prediction of preloading an application is triggered, the following operations are executed. Historical sample usage information of the terminal during a preset period is collected. The historical sample usage information includes a sequence associated with historical usage timing of at least two applications, and historical status feature information of the terminal corresponding to a time point of launching each application in the sequence associated with the historical usage timing. The sequence associated with the historical usage timing is input to the recurrent-neural-network submodel, and the historical status feature information is input to the fully-connected-network submodel, so as to train the hybrid network model to acquire the model used for application prediction. In this way, the sequence associated with the historical usage timing of the at least two applications and the historical status feature information of the terminal corresponding to the time point of launching each application in the sequence associated with the historical usage timing, which truly reflect user behavior, can be fully utilized and adopted as sample sources for training of the model used for application prediction, thereby optimizing the mechanism for preloading and increasing the accuracy of the prediction of the at least one application to be launched.

In the implementation of the present disclosure, the historical sample usage information of the terminal during the preset period is collected. The historical sample usage information reflects habits of using the applications in the preset period and corresponding status feature information of the terminal. The historical sample usage information includes the sequence associated with the historical usage timing of the at least two applications, and the historical status feature information of the terminal corresponding to the time point of launching each application in the sequence associated with the historical usage timing. In an implementation, the historical sample usage information of the terminal within one month is collected. The sequence associated with the historical usage timing in the historical sample usage information is represented as: $APP_1 \rightarrow APP_2 \rightarrow APP_3 \rightarrow \ldots \rightarrow APP_{n-2} \rightarrow APP_{n-1} \rightarrow APP_n$, and the historical status feature information of the terminal corresponding to the time point of launching each application in the sequence associated with the historical usage timing, $APP_1 \rightarrow APP_2 \rightarrow APP_3 \rightarrow \ldots \rightarrow APP_{n-2} \rightarrow APP_{n-1} \rightarrow APP_n$, can be represented by $T_1, T_2, \ldots T_{n-1}, T_n$, respectively. It can be understood that the $APP_n$ represents applications used at different time points and $T_n$ represents the historical status feature information of the terminal corresponding to the time point of launching each application in the sequence associated with the historical usage timing. The sequence associated with the historical usage timing of the applications during the preset period, and the historical status feature information of the terminal corresponding to the time point of launching each application in the sequence associated with the historical usage timing are adopted as training samples of the model used for application prediction.

In an implementation, the sequence associated with the historical usage timing as a whole is input to the recurrent-neural-network submodel in the hybrid network model, and the corresponding status feature information as a whole is input to the fully connected network submodel in the hybrid network model, so as to train the hybrid network model to acquire the model used for application prediction. In an implementation, multiple sets of sequences associated with the usage timing are acquired by dividing the sequence associated with the usage timing according to a timing relationship. Each set of sequence associated with the usage timing and corresponding historical status feature information are adopted as a subsample. A sample set consisted by the subsamples is adopted as a training sample for the model used for application prediction. The sequence associated with the usage timing can be divided in the form of a sliding window. In an implementation, a sliding window having a fixed size slides in an isometric step along the sequence associated with the usage timing of the applications during the preset period, and each sequence associated with the usage timing corresponding to one sliding window is used as a set of sequence associated with the usage timing. In an implementation, a sliding window that can be scaled to different scales is used, and the sliding window is scaled once per slide. The sliding window that can be scaled to multiple scales slides in a non-isometric step along the sequence associated with the usage timing of the applications during the preset period, and each sequence associated with the usage timing corresponding to one sliding window is used as a set of sequence associated with the usage timing. For example, the historical sequence associated with the usage timing $APP_1 \rightarrow APP_2 \rightarrow APP_3 \rightarrow \ldots \rightarrow APP_{n-2} \rightarrow APP_{n-1} \rightarrow APP_n$ is divided into n−2 sets of sequences associated with the usage timing. The subsequences associated with the usage timing after division are:

$APP_1 \rightarrow APP_2 \rightarrow APP_3$, $APP_2 \rightarrow APP_3 \rightarrow APP_4$, ..., $APP_{n-3} \rightarrow APP_{n-2} \rightarrow APP_{n-1}$, $APP_{n-2} \rightarrow APP_{n-1} \rightarrow APP_n$. Accordingly, each set of subsequence associated with the usage timing is input to the recurrent-neural-network submodel, and historical status feature information corresponding to each set of subsequence associated with the usage timing is input to the fully connected network submodel, so as to train the hybrid network model to acquire the model used for application prediction.

What needs to be illustrated is that the sequence associated with the usage timing of the current application includes a sequence associated with the current application, and an application used prior to the current application. In the present disclosure, the application to be launched at next time can be predicted according to the sequence associated with the usage timing of the current application and the current status feature information of the terminal. The sequence associated with the historical usage timing includes a previous usage sequence of the application, and the application to be launched at next time.

In some implementations, the target application is preloaded as follows. An application interface of the target application is preloaded according to an active window stack for preloading. The active window stack for preloading has boundary coordinates locating outside a coordinate range of a display screen. In this way, the application interface of an application needed to be preloaded can be preloaded according to the active window stack for preloading locating outside the display screen. Furthermore, by adopting the method for preloading, preparation work before launching the target application can be completed to a large extent, the speed of launching the target application can be increased, and display of display content of a foreground application on the display screen cannot be affected.

In the implementation of the present disclosure, an active window can be understood as a separate interface that is directly responsible for interaction with the user and operations of the user. The interface can be named with different nouns in different operating systems. For convenience of understanding, in the following Android operating system is taken as an example for illustration.

In the Android system, the active window is named as "Activity". The Activity is a component responsible for interaction with the user. The Activity provides a screen (which can be understood as a screen interface rather than a physical display screen) for interaction with the user to complete a task. In an Android application, an Activity is usually a separate screen that can display some widgets and can also monitor and handle user events. For management of one Activity, two concepts "Task" (task stack) and "Stack" (active window stack) are included. One Task corresponds to one application and is configured to store at least one Activity. One or more Activities can be stored in one Task and the Activities follow a principle of "first in, last out; last in, first out". One Stack is configured to manage at least one Task. Usually, one Stack manages each Task including at least one Activity to be displayed on one screen. One Stack can manage one or more Tasks. Certainly, each Stack also follows a basic management principle followed by the stack. The screen described herein is not necessarily a completely separate display screen. Taking "two screens" as an example, the two screens may be just two areas in a complete display screen, and independently display contents. Certainly, the "two screens" may also be two separate display screens when the terminal has two or even more than two separate display screens.

In the Android system, a multi-window mode is supported, and the multi-window mode may include a split-screen mode, a picture-in-picture mode, and a free mode (FreeForm). In the multi-window mode, each Stack for one application may have its own size, and may include a top coordinate, a bottom coordinate, a left coordinate, and a right coordinate in a coordinate system, where in the coordinate system, a top left corner of the screen of the terminal is taken as the origin. For example, boundaries of a rectangle are generally described by (a, b, c, d) and may be represented by coordinates of a top left corner and coordinates of a bottom right corner of the rectangle. That is, the coordinates of the top left corner of the rectangle are (a, b), and the coordinates of the bottom right corner of the rectangle are (c, d). Such a rectangular region has a size corresponding to the size of one Stack. In one Stack a layout of applications is based on the size of the Stack. That is, an application interface corresponding to one Activity is displayed within the bounds of the Stack.

In the multi-window mode, multiple applications may be allowed to be visible (to be visible to both the system and the user or to be visible to the system only). When an application is visible to both the system and the user, it means that the application is displayed on the display screen and is visible to the user. When an application is visible to the system only, it means that the application is only visible to the operating system and is invisible to the user, and the application may be obscured by the foreground application, or displayed outside the display screen as implemented in the present disclosure.

In the implementation of the present disclosure, the application interface of the target application can be preloaded outside the display screen according to a multi-window mechanism of the operating system. With the multi-window mechanism, the boundary coordinates of the active window stack for preloading are set to locate outside the coordinate range of the display screen to achieve the purpose of being invisible to the user, and therefore the display of the display content of the foreground application on the display screen cannot be affected.

In the multi-window mode, multiple types of Stacks may be included. For example, a Home Stack represents a stack for display of a desktop application, and an App Stack represents a stack for display of a third-party application. Other split-screen stacks may also be included. Content contained in the above three types of Stacks may be displayed on the display screen, and the three types of Stacks are collectively referred to as an application active window stack in the implementation of the present disclosure. In the implementation of the present disclosure, the active window stack for preloading is added to represent a Stack for display of an application preloaded, and the coordinates of the boundaries of the active window stack for preloading are set to locate outside the coordinate range of the display screen. The application to be preloaded can be displayed on a display region provided according to the active window stack for preloading. For the Android system, a new Stack specially for displaying applications preloaded can be created according to the multi-window mechanism of the Android system. In the implementation of the present disclosure, the new Stack is created to enable the new active window stack for preloading to have its own size and visibility, thereby achieving the purpose of finishing preloading outside the display screen.

In the implementation of the present disclosure, a time for creating the active window stack for preloading is not limited. The active window stack for preloading may be set to be resident by default before the terminal is shipped, that is, the active window stack for preloading always exists. The active window stack for preloading may also be created after the terminal is turned on or unlocked. Further, the active window stack for preloading may be created after the event of preloading an application is triggered (before the target application is determined). In an implementation, according to the active window stack for preloading, the application interface of the target application is preloaded as follows. Whether the active window stack for preloading exists is determined. When the active window stack for preloading is absent, the active window stack for preloading is created. The application interface of the target application is preloaded according to the active window stack for preloading. In this way, whether the active window stack for preloading exists is determined after the target application to be preloaded is determined; if the active window stack for preloading exists, no new stack is required to be created, and if the active window stack for preloading is absent, the active window stack for preloading is performed, so that system resources can be saved. It can be understood that when multiple target applications are included, that is, when multiple target applications need to be preloaded continuously in a short period, since the active window stack for preloading is created before the first target application starts to be loaded, the active window stack for preloading still exists before the second target application starts to be preloaded, and it is not necessary to perform the above determination.

In the implementation of the present disclosure, a specific process for preloading the application interface of the target application according to the active window stack for preloading is not limited. For example, the application interface may be drawn and displayed according to the size of the active window stack for preloading.

In some implementations, according to the active window stack for preloading, the application interface of the target application is preloaded as follows. A target process for the target application is created. A task stack for the target application is created in the active window stack for preloading. An active window for the target application is launched in the task stack according to the target process. The application interface of the target application is drawn and displayed according to the active window launched. In this way, it is possible to draw and display the application interface of the target application according to the active window stack for preloading, where boundary coordinates of the active window stack for preloading locates outside the coordinate range of the display screen, and thus running and display of the foreground application are not interfered, system stability is ensured, and the speed of launching the target application is increased. While creating the target process, a procedure of initiating the target process may be included. During execution of the foregoing operations, preloading of other resources may be also involved, such as application service launching, memory allocation, file content reading, network data acquisition, and the like. Procedures of preloading the other resources are not limited in the implementations of the present disclosure.

In some implementations, during preloading the target application, determine whether an operation of opening a preset code path corresponding to the current application is detected, and pause preloading the target application when the operation of opening the preset code path is detected. In this way, during preloading the at least one application to be launched, the fluency of usage of the current application can be ensued, such that the current application can be normally used, thereby satisfying user experience.

In the implementation of the present disclosure, during preloading the at least one target application, determine whether the operation of opening the preset code path corresponding to the current application is detected, and pause preloading the at least one target application when the operation of opening the preset code path is detected. It can be understood that during preloading the at least one target application, the application currently running may be still used and some related functions are launched. The preset code path may include a code path needed to be accessed during a process of completely opening the application. In an implementation, an application running currently is an application D, and a function a of the application D needs to be opened. At this point, a code path a1 corresponding to the function a needs to be accessed to open the function a. If preset code paths corresponding to the application D includes the code path a1, a code path b1, and a code path c1, when the operation of opening the code path a1 is detected, it indicates that the operation of opening the preset code path corresponding to the current application is detected, thereby preloading the target application is paused to prevent the operation of preloading the target application from affecting the normal usage of the current application. In an implementation, when it is detected that the operation of opening the preset code path of the current application is completed, resume preloading the target application. In an implementation, it is detected that the time of triggering the open of the function a is t1. That is, it is detected that the time of triggering the open of the code path a1 is t1, and that the time at which the code path a1 is completely loaded is t2, then loading the target application is paused during the period from t2 to t1. For example, if an application A is being preloaded at the time t1, preloading the application A is terminated during the period from t2 to t1. After the time t2, preloading the application A is resumed, and preloading other target applications that are not preloaded is continued.

In some implementations, the at least one target application is preloaded as follows. A central processing unit (CPU) usage rate of the terminal is acquired, and the at least one target application is preloaded when the CPU usage rate is lower than a preset usage rate threshold. Or, a value of remaining storage space of the terminal is acquired, and the at least one target application is preloaded when the value of the remaining storage space is larger than a preset storage threshold. In this way, the at least one application to be launched can be preloaded without affecting the normal usage of the current application, thereby satisfying user requirements.

The CPU usage rate of the terminal indicates total CPU resources occupied by all running applications in the terminal. The higher the CPU usage rate of the terminal, the more total CPU resources occupied by all the running applications in the terminal, and the lower a response speed of the terminal. On the contrary, the lower the CPU usage rate of the terminal, the less total CPU resources occupied by all the running applications in the terminal, and the higher the response speed of the terminal. When the CPU usage rate of the terminal is lower than the preset usage rate threshold, it indicates that at current time available CPU resources of the terminal are relatively large, and preloading the target application cannot affect the normal usage of the current application and a processing speed of the terminal. Therefore, the target application is preloaded when the CPU usage rate of the terminal is lower than the preset usage rate threshold.

The value of the remaining storage space reflects the size of available storage space of the terminal. The larger the value of the remaining storage space, the larger the available storage space of the terminal. On the contrary, the smaller the value of the remaining storage space, the smaller the available storage space of the terminal. When the value of the remaining storage space of the terminal is larger than the preset storage threshold, it indicates that the available storage space of the terminal is large, and preloading the target application cannot affect the normal usage of the current application and the processing speed of the terminal. Therefore, the at least one target application is preloaded when the value of the remaining storage space is larger than the preset storage threshold.

In some implementations, each target application is preloaded as follows. The target applications are recorded in a list for preloading an application. Each target application in the list for preloading an application is preloaded in sequence every a preset loading period until all the target applications are loaded. In this way, the terminal may not experience a lag in the process of loading the target application.

In the implementations of the present disclosure, when multiple target applications are preloaded at the same time, that is, when multiple target applications are opened at the same time, the terminal may easily experience a lag, and the usage of the current application is affected, thereby resulting in poor user experience. Therefore, when multiple target applications are included, time of preloading the multiple target applications can be staggered by a strategy for preloading. In an implementation, five target applications are to be launched, namely, the application A, the application B, the application C, an application D, and an application E are to be launched. The five applications are added into the list for preloading an application. That is, the application A, the application B, the application C, the application D, and the application E compose the list for preloading an application. In an implementation, the applications in the list for preloading an application are sorted in descending order according to a probability value of launching each of the applications. One target application in the list for preloading an application is preloaded every the preset preloading period. For example, according to the probability value of launching each of the five applications, the five applications are arranged in descending order as: the application C, the application B, the application A, the application E, the application D. Generally, opening an application usually takes about two to six seconds, and no more than 10 seconds. The preset preloading period can be set to be ten seconds. Therefore, the application C can be first preloaded, the application B can be preloaded after ten seconds, the application A can be preloaded after another ten seconds, and so on, until all the target applications are loaded in the same manner. What needs to be illustrated is that when an operation for opening an application is detected during loading the target application, loading the target application is stopped. The application currently opened is taken as an application currently in use, and predicting another target application to be launched is performed.

Figure 3:
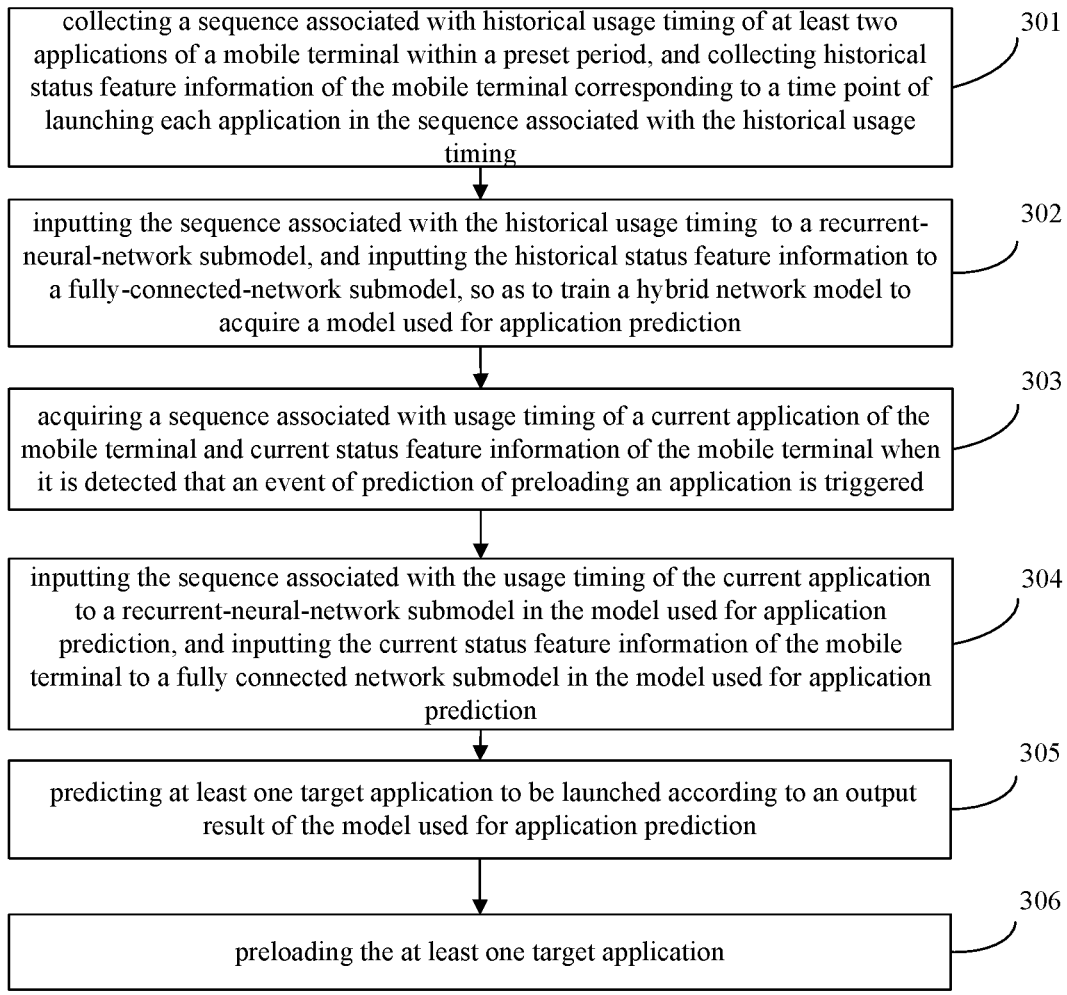
FIG. 3 is a flow chart illustrating another method for preloading an application according to an implementation of the present disclosure.

FIG. 3 is a schematic flow chart illustrating another method for preloading an application according to an implementation of the present disclosure. The method begins at block 301.

At block 301, a sequence associated with historical usage timing of at least two applications of a terminal within a preset period is collected, and historical status feature information of the terminal corresponding to a time point of launching each application in the sequence associated with the historical usage timing is collected.

At block 302, the sequence associated with the historical usage timing is input to a recurrent-neural-network submodel, and the historical status feature information is input to a fully-connected-network submodel, so as to train a hybrid network model to acquire an model used for application prediction.

At block 303, a sequence associated with usage timing of a current application of the terminal and current status feature information of the terminal are acquired when it is detected that an event of prediction of preloading an application is triggered.

The current status feature information includes at least one of the following: time information, date category, on and off status of a mobile data network, wireless hotspot connection status, identity information of a connected wireless hotspot, duration of that the current application stays in the background, time of last switch of the current application to the background, plugging and unplugging status of an earphone jack, charging status, power information of a battery, display duration of a screen, motion status of the terminal, and location information of the terminal.

At block 304, the sequence associated with the usage timing of the current application is input to a recurrent-neural-network submodel in the model used for application prediction, and the current status feature information of the terminal is input to a fully connected network submodel in the model used for application prediction.

At block 305, at least one target application to be launched is predicted according to an output result of the model used for application prediction.

At block 306, the at least one target application is preloaded.

According to the method for preloading an application provided in the implementation of the present disclosure, a usage rule of applications of the terminal corresponding to the historical status feature information can be fully utilized to train the hybrid network model constructed by the recurrent-neural-network submodel and the fully connected network submodel to generate the model used for application prediction, thereby further optimizing a mechanism for preloading and improving accuracy of prediction of the at least one application to be launched.

Figure 4:
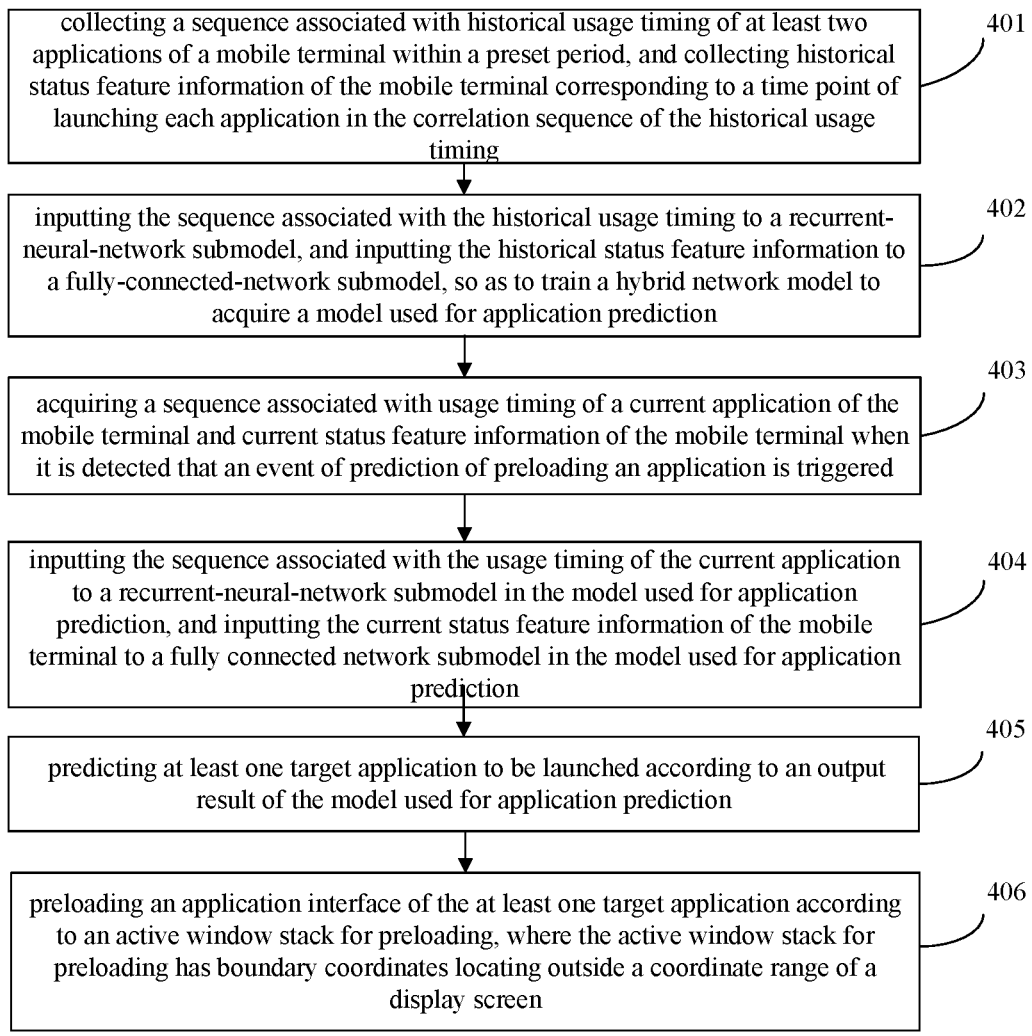
FIG. 4 is a flow chart illustrating another method for preloading an application according to an implementation of the present disclosure.

FIG. 4 is a schematic flow chart illustrating another method for preloading an application according to an implementation of the present disclosure. The method begins at block 401.

At block 401, a sequence associated with historical usage timing of at least two applications of a terminal with a preset period is collected, and historical status feature information of the terminal corresponding to the time point of launching each application in the sequence associated with the historical usage timing is collected.

At block 402, the sequence associated with the historical usage timing is input to a recurrent-neural-network submodel, and the historical status feature information is input to a fully-connected-network submodel, so as to train a hybrid network model to acquire a model used for application prediction.

At block 403, a sequence associated with usage timing of a current application of the terminal and current status feature information of the terminal are acquired in response to detecting that an event of prediction of preloading an application is triggered.

The current status feature information includes at least one of the following: time information, date category, on and off status of a mobile data network, wireless hotspot connection status, identity information of a connected wireless hotspot, duration of that the current application stays in the background, time of last switch of the current application to the background, plugging and unplugging status of an earphone jack, charging status, power information of a battery, display duration of a screen, motion status of the terminal, and location information of the terminal.

At block 404, the sequence associated with the usage timing of the current application is input to a recurrent-neural-network submodel in the model used for application prediction, and the current status feature information of the terminal is input to a fully connected network submodel in the model used for application prediction.

At block 405, at least one target application to be launched is predicted according to an output result of the model used for application prediction.

At block 406, an application interface of the at least one target application is preloaded according to a active window stack for preloading, where the active window stack for preloading has boundary coordinates locating outside a coordinate range of a display screen.

According to the method for preloading an application provided in the implementation of the present disclosure, the application interface of an application needed to be preloaded can be preloaded according to the active window stack for preloading, where the active window stack for preloading locates outside the display screen. Furthermore, by adopting the method for preloading, preparation work before launching an application can be completed to a large extent, a speed of launching the target application can be increased, and display of display content of a foreground application on the display screen cannot be affected.

Figure 5:
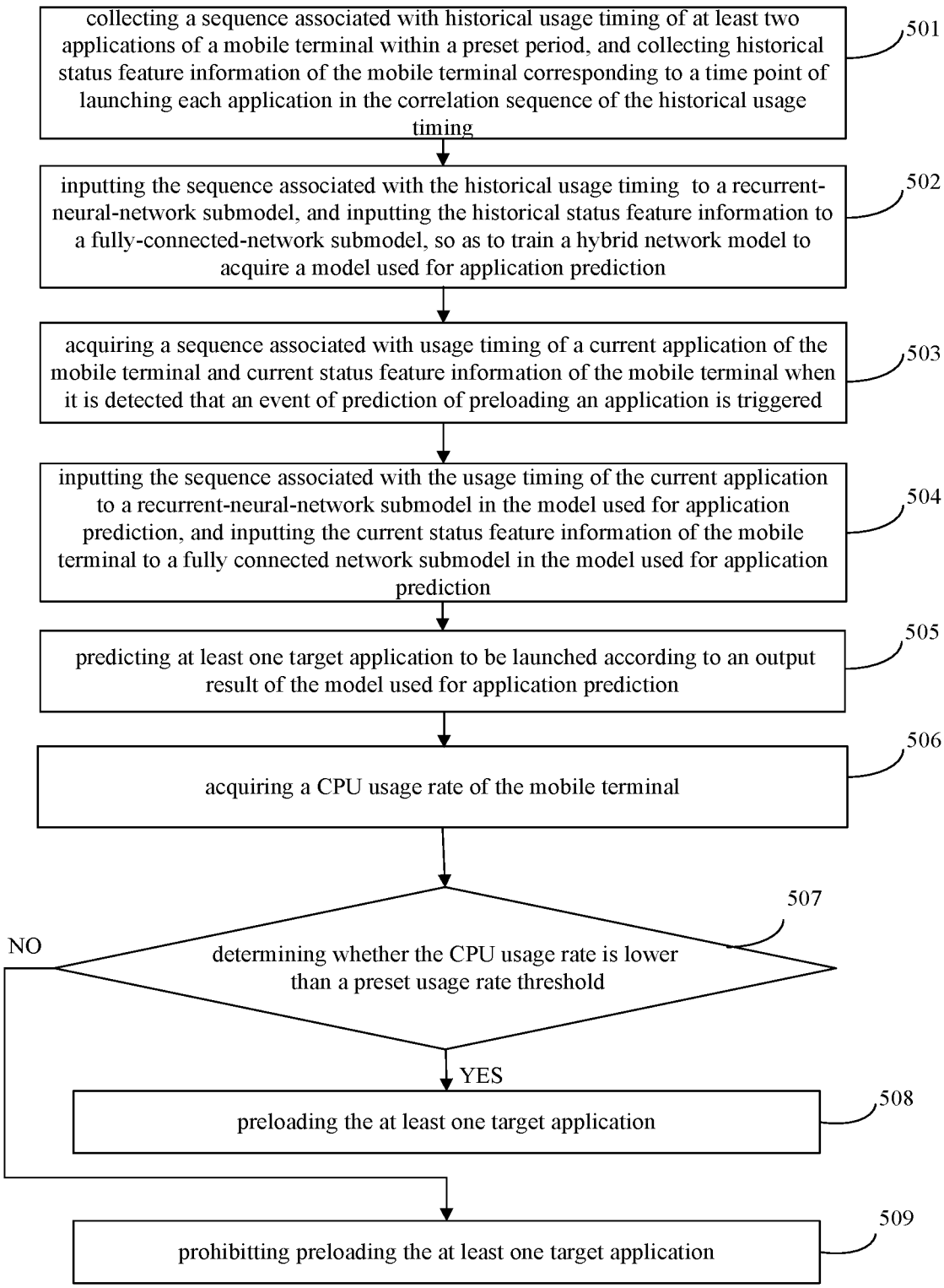
FIG. 5 is a flow chart illustrating another method for preloading an application according to an implementation of the present disclosure.

FIG. 5 is a schematic flow chart illustrating another method for preloading an application according to an implementation of the present disclosure. The method begins at block 501.

At block 501, a sequence associated with historical usage timing of at least two applications of a terminal is collected, and historical status feature information of the terminal corresponding to a time point of launching each application in the sequence associated with historical usage timing is collected.

At block 502, the sequence associated with the historical usage timing is input to a recurrent-neural-network submodel, and the historical status feature information is input to a fully-connected-network submodel, so as to train a hybrid network model to acquire a model used for application prediction.

At block 503, a sequence associated with usage timing of a current application of the terminal and current status feature information of the terminal are acquired in response to detecting that an event of prediction of preloading an application is triggered.

The current status feature information includes at least one of the following: time information, date category, on and off status of a mobile data network, wireless hotspot connection status, identity information of a connected wireless hotspot, duration of that the current application stays in the background, time of last switch of the current application to the background, plugging and unplugging status of an earphone jack, charging status, power information of a battery, display duration of a screen, motion status of the terminal, and location information of the terminal.

At block 504, the sequence associated with the usage timing of the current application is input to a recurrent-neural-network submodel in the model used for application prediction, and the current status feature information of the terminal is input to a fully connected network submodel in the model used for application prediction.

At block 505, at least one target application to be launched is predicted according to an output result of the model used for application prediction.

At block 506, a CPU usage rate of the terminal is acquired.

At block 507, whether the CPU usage rate is lower than a preset usage rate threshold is determined. An operation at block 508 is performed when the CPU usage rate is lower than the preset usage rate threshold. An operation at block 509 is performed when the CPU usage rate is higher than the preset usage rate threshold.

At block 508, the at least one target application is preloaded.

In an implementation, one target application is preloaded as follows. An application interface of the target application is preloaded according to an active window stack for preloading, where the active window stack for preloading has boundary coordinates locating outside a coordinate range of a display screen.

In an implementation, during preloading the target application, determine whether an operation of opening a preset code path corresponding to the current application is detected, and pause preloading the target application when the operation of opening the preset code path is detected.

At block 509, prohibit preloading the at least one target application.

According to the method for preloading an application provided in the implementation of the present disclosure, the at least one application to be launched can be preloaded without affecting the normal usage of the current application, thereby satisfying user requirements.

Figure 6:
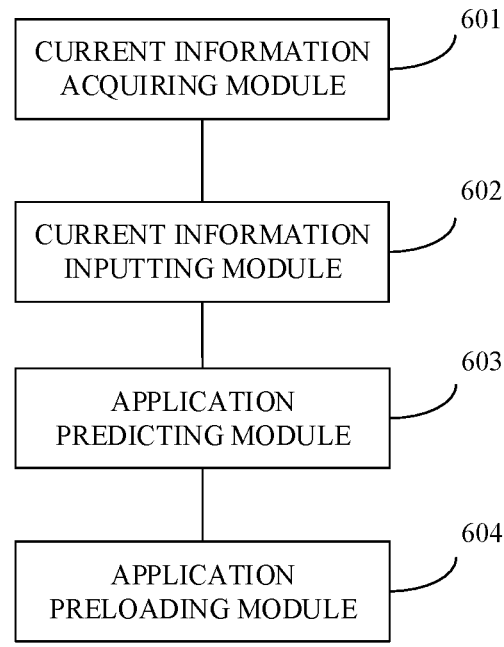
FIG. 6 is a block diagram illustrating a device for preloading an application according to an implementation of the present disclosure.

FIG. 6 is a schematic structural diagram illustrating a device for preloading an application according to an implementation of the present disclosure. The device can be implemented with software and/or hardware, and generally, the device can be integrated in a terminal. The device can preload at least one application to be launched by executing the method for preloading an application. As illustrated in FIG. 6, the device includes a current information acquiring module 601, a current information inputting module 602, an application predicting module 603, and an application preloading module 604.

The current information acquiring module 601 is configured to acquire current usage information of a terminal in response to detecting that an event of prediction of preloading an application is triggered. The current usage information includes a sequence associated with usage timing of a current application and current status feature information of the terminal.

The current information inputting module 602 is configured to input the current usage information to a model used for application prediction. The model used for application prediction includes a hybrid network model generated according to a usage rule of applications of the terminal corresponding to historical status feature information.

The application predicting module 603 is configured to predict at least one target application to be launched according to an output result of the model used for application prediction.

The application preloading module 604 is configured to preload the at least one target application.

According to the technical solution for preloading an application, the current usage information of the terminal is acquired in response to detecting that the event of prediction of preloading an application is triggered. The current usage information includes the sequence associated with the usage timing of the current application and the current status feature information of the terminal. The current usage information is input to the model used for application prediction. The model used for application prediction includes the hybrid network model generated according to the usage rule of the applications of the terminal corresponding to the historical status feature information. The at least one target application to be launched is predicted according to the output result of the model used for application prediction. The at least one target application is preloaded. By means of the above technical solution, technical problems can be solved, such as that too many resources are preloaded for applications, too many resources are occupied by preloading an application, power consumption is increased, and fluency of usage of the terminal is affected. Furthermore, by adopting the hybrid network model, accuracy of prediction of the at least one application to be launched is increased, system power consumption of the terminal and an occupation rate of a memory of the terminal are further reduced, thereby optimizing a mechanism for preloading an application.

In an implementation, the hybrid network model includes a recurrent-neural-network submodel and a fully connected network submodel constructed according to a fully connected layer. An output layer of the recurrent-neural-network submodel and an output layer of the fully connected network submodel forms the hybrid network model according to a fully connected relation.

Correspondingly, the current usage information is input to the model used for application prediction as follows. The sequence associated with the usage timing of the current application is input to the recurrent-neural-network submodel, and the current status feature information is input to the fully-connected-network submodel.

In an implementation, the device further includes a sample information acquiring module and a sample information inputting module. The sample information acquiring module is configured to collect historical sample usage information of the terminal during a preset period before detecting that the event of prediction of preloading an application is triggered. The historical sample usage information includes a sequence associated with historical usage timing of at least two applications, and historical status feature information of the terminal corresponding to a time point of launching each application in the sequence associated with the historical usage timing. The sample information inputting module is configured to input the sequence associated with the historical usage timing to the recurrent-neural-network submodel, and to input the historical status feature information to the fully-connected-network submodel, so as to train the hybrid network model to acquire the model used for application prediction.

In an implementation, the application preloading module is configured to preload an application interface of the target application according to an active window stack for preloading, where the active window stack for preloading has boundary coordinates locating outside a coordinate range of a display screen.

In an implementation, during preloading the target application, determine whether an operation of opening a preset code path corresponding to the current application is detected, and pause preloading the target application when the operation of opening the preset code path is detected.

In an implementation, the application preloading module is configured to acquire a CPU usage rate of the terminal and preload the target application when the CPU usage rate is lower than a preset usage rate threshold, or to acquire a value of remaining storage space of the terminal and preload the target application when the value of the remaining storage space is larger than a preset storage threshold.

In an implementation, the status feature information includes one of the following: time information, date category, on and off status of a mobile data network, wireless hotspot connection status, identity information of a connected wireless hotspot, duration of that the current application stays in the background, time of last switch of the current application to the background, plugging and unplugging status of an earphone jack, charging status, power information of a battery, display duration of a screen, motion status of the terminal, and location information of the terminal.

A storage medium containing computer executable instructions is provided in the implementation of the present disclosure. The computer executable instructions are operable with a computer processor to execute the method for preloading an application. The method includes the following.

Current usage information of a terminal is acquired in response to detecting that an event of prediction of preloading an application is triggered. The current usage information includes a sequence associated with usage timing of a current application and current status feature information of the terminal. The current usage information is input to a model used for application prediction. The model used for application prediction includes a hybrid network model generated according to a usage rule of applications of the terminal corresponding to historical status feature information. At least one target application to be launched is predicted according to an output result of the model used for application prediction. The at least one target application is preloaded.

The storage medium refers to any of various types of memory devices or storage devices. The term "storage medium" is intended to include: a mounting medium such as a compact disc read-only memory (CD-ROM), a floppy disk, or a tape device; a computer system memory or a random access memory such as a dynamic random access memory (DRAM), a display data random access memory (DDRRAM), a static random access memory (SRAM), an extended data output random access memory (EDORAM), and a Rambus random access memory (Rambus RAM); a non-transitory memory such as a flash memory and a magnetic medium (such as a hard disk or an optical memory); a register and other similar types of memory element, and the like. The storage medium may also include other types of memory or a combination thereof. In addition, the storage medium may be located in a first computer system in which a program is executed, or may be located in a second computer system coupled to the first computer system via a network, such as the Internet. The second computer system can provide program instructions to the first computer for execution. The term "storage medium" can include two or more storage media that may reside in different locations (e.g., different computer systems connected through a network). The storage medium may store program instructions (e.g., computer programs) executable by one or more processors.

The storage medium containing computer executable instructions is provided in the implementation of the present disclosure. The computer executable instructions contained in the storage medium are not limited to executing the operations of preloading applications as described above, and can also execute relevant operations of the method for preloading an application according to the implementations of the disclosure.

Figure 7:
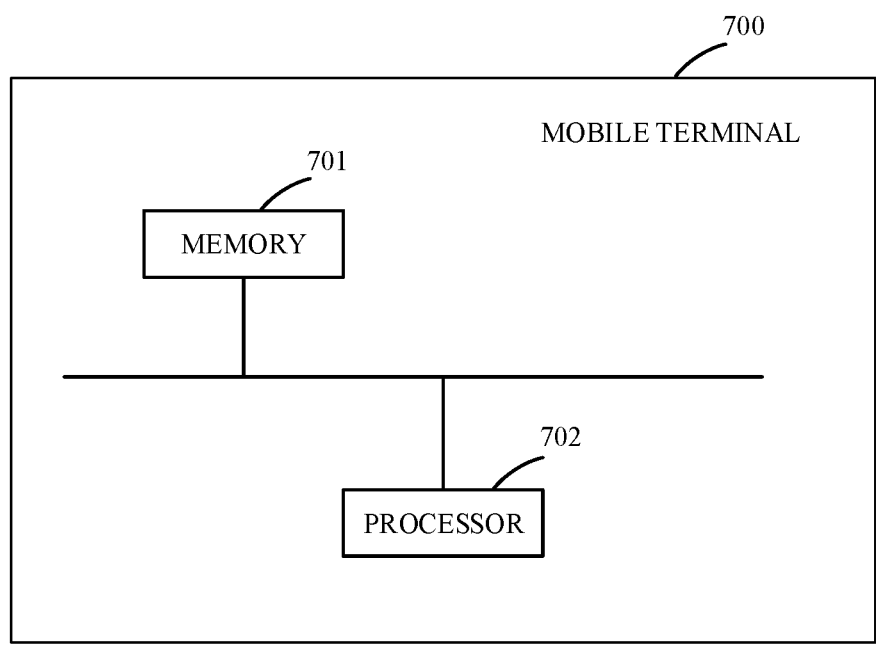
FIG. 7 is a block diagram illustrating a terminal according to an implementation of the present disclosure.

A terminal is provided in the implementation of the present disclosure. The device for preloading an application provided in the implementation of the present disclosure can be integrated in the terminal. FIG. 7 is a schematic structural diagram illustrating a terminal according to an implementation of the present disclosure. A terminal 700 includes a memory 701, a processor 702, and computer programs stored in the memory and executable by the processor. The processor 702 is configured to execute the computer programs to implement the method for preloading an application provided in the implementation of the present disclosure.

According to the terminal provided in the implementation of the present disclosure, technical problems are solved, such as that too many resources are preloaded for applications, too many resources are occupied by preloading an application, power consumption is increased, and fluency of usage of the terminal is affected. Accuracy of prediction of the at least one application to be launched is increased, system power consumption of the terminal and an occupation rate of a memory of the terminal are further reduced, thereby optimizing a mechanism for preloading an application.

Figure 8:
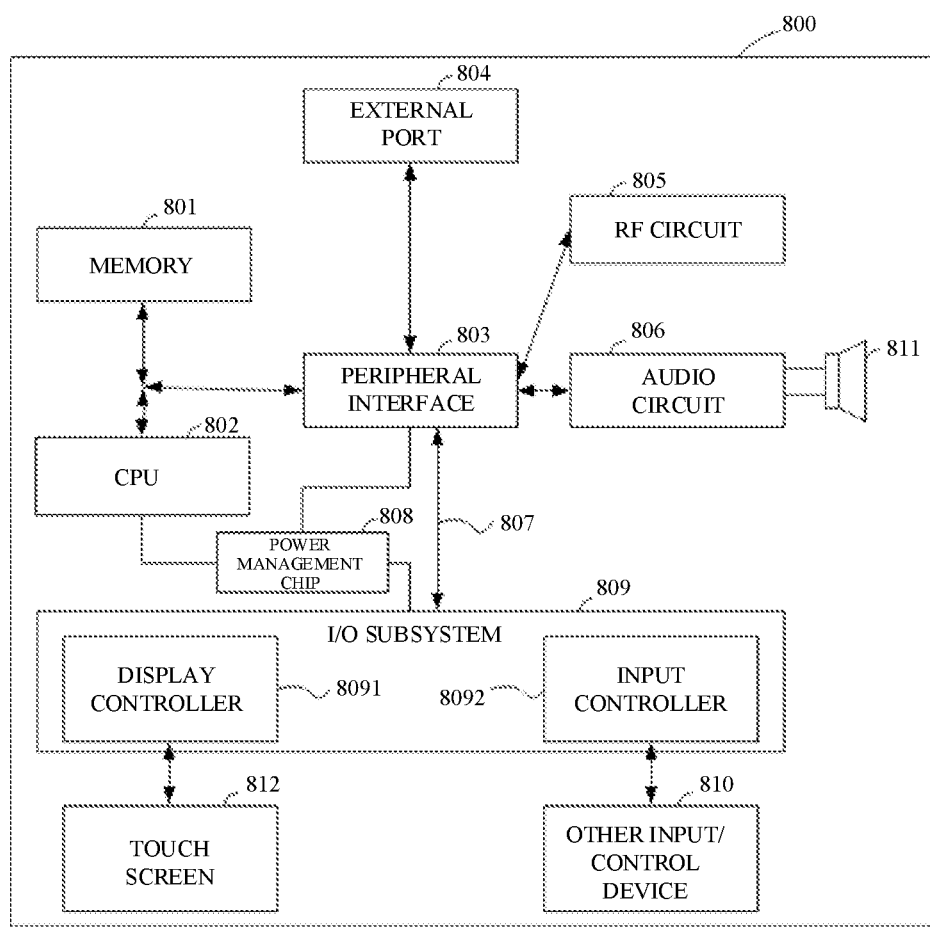
FIG. 8 is a block diagram illustrating another terminal according to an implementation of the present disclosure.

FIG. 8 is a schematic structural diagram illustrating another terminal according to an implementation of the present disclosure. As illustrated in FIG. 8, the terminal includes a housing (not illustrated), a memory 801, and a CPU 802 (also referred to as a processor, hereinafter as CPU for short), a circuit board (not illustrated), and a power supply circuit (not illustrated). The circuit board is disposed inside a space defined by the housing. The CPU 802 and the memory 801 are disposed on the circuit board. The power supply circuit is configured to supply power to each circuit or component of the terminal. The memory 801 is configured to store executable program codes. The CPU 802 is configured to run a computer program corresponding to the executable program codes by reading the executable program codes stored in the memory 801 to carry out the following operations.

Current usage information of a terminal is acquired in response to detecting that an event of prediction of preloading an application is triggered. The current usage information includes a sequence associated with usage timing of a current application and current status feature information of the terminal. The current usage information is input to a model used for application prediction. The model used for application prediction includes a hybrid network model generated according to a usage rule of applications of the terminal corresponding to historical status feature information. At least one target application to be launched is predicted according to an output result of the model used for application prediction. The at least one target application is preloaded.

The terminal further includes a peripheral interface 803, a radio frequency (RF) circuit 805, an audio circuit 806, a speaker 811, a power management chip 808, an input/output (I/O) subsystem 809, other input/control devices 810, a touch screen 812, and an external port 804, which are communicated via one or more communication buses or signal lines 807.

What needs to be illustrated is that the terminal 800 illustrated is exemplary and the terminal 800 may have more or fewer components than those illustrated in FIG. 8. For example, two or more components may be combined, or different component configurations can be adopted in the terminal. The various components illustrated in FIG. 8 can be implemented in hardware, software, or a combination of hardware and software including one or more signal processing and/or application specific integrated circuits.

The following describes a mobile phone as an example of a terminal for preloading an application.

The memory 801 can be configured to be accessed by the CPU 802, the peripheral interface 803 and so on. The memory 801 may include a high-speed random-access memory and may further include a non-transitory memory such as one or more magnetic disk storage devices, flash memory devices, or other transitory solid-state memory devices.

The peripheral interface 803 is configured to connect the input and output peripherals of the device to the CPU 802 and the memory 801.

The I/O subsystem 809 can be configured to connect the input and the output peripherals, such as connecting the touch screen 812 and other input/control devices 810 to the peripheral interface 803. The I/O subsystem 809 may include a display controller 8091 and one or more input controllers 8092 configured to control other input/control devices 810. The one or more input controllers 8092 are configured to receive electrical signals from or send electrical signals to other input/control devices 810, where other input/control devices 810 may include a physical button (a press button, a rocker button, etc.), a dial, a slide switch, a joystick, or a click wheel. What needs to be illustrated is that the input controller 8092 can be coupled with any of a keyboard, an infrared port, a universal serial bus (USB) interface, and a pointing device such as a mouse.

The touch screen 812 functions as an input interface and an output interface between a terminal and a user, and is configured to display a visual output to the user. The visual output may include graphics, text, icons, videos, and the like.

The display controller 8091 in the I/O subsystem 809 is configured to receive an electrical signal from or send an electrical signal to the touch screen 812. The touch screen 812 is configured to detect contact on the touch screen. The display controller 8091 is configured to convert the detected contact into an interaction with a user interface object displayed on the touch screen 812, that is, to realize human-computer interaction. The user interface object displayed on the touch screen 812 may be an icon of a running game, an icon indicating connection to corresponding networks, and the like. What needs to be illustrated is that the device may also include a light mouse, which is a touch sensitive surface that does not display a visual output, or can be an extension of a touch sensitive surface formed by the touch screen.

The RF circuit 805 is configured to establish communication between a mobile phone and the wireless network (i.e., network side) and to transmit and receive data between the mobile phone and the wireless network, for example, to transmit and receive short messages, emails, and the like. The RF circuit 805 is configured to receive and transmit RF signals (also known as electromagnetic signals), to convert an electrical signal into an electromagnetic signal or convert an electromagnetic signal into an electrical signal, and to communicate with a communication network and other devices through electromagnetic signals. The RF circuit may include known circuits for performing these functions, including but not limited to an antenna system, an RF transceiver, one or more amplifiers, a tuner, one or more oscillators, a digital signal processor, a coder-decoder (CODEC) chipset, a subscriber identity module (SIM) and so on.

The audio circuit 806 is configured to receive audio data from the peripheral interface 803, to convert the audio data into an electric signal, and to transmit the electric signal to the speaker 811.

The speaker 811 is configured to restore the voice signal received by the mobile phone from the wireless network via the RF circuit 805 to sound and to play the sound to the user.

The power management chip 808 is configured for power supply and power management of the hardware connected to the CPU 802, the I/O subsystem 809, and the peripheral interfaces 803.

The device for preloading an application, the storage medium, and the terminal provided in the above implementations have corresponding functional modules to execute the corresponding method for preloading an application and advantageous effects of executing the method. For technical details not described herein, reference may be made to the description of the method for preloading an application.

What needs to be illustrated is that the above are only implementations of the present disclosure and the technical principles applied thereto. Those skilled in the art will appreciate that the present disclosure is not limited to the implementations described herein, and that various changes, modifications, and substitutions can be made by those skilled in the art without departing from the scope of the disclosure. While the disclosure has been described in connection with certain implementations, it is to be understood that the disclosure is not to be limited to the disclosed implementations but, on the contrary, is intended to cover various modifications and equivalent arrangements included within the scope of the disclosure. The scope of the disclosure is determined by the scope of the appended claims.

What is claimed is:

1. A method for preloading an application, comprising:
   acquiring, in response to detecting that an event of prediction of preloading an application is triggered, current usage information of a terminal, wherein the current usage information comprises a sequence associated with usage timing of a running application of the terminal and current status feature information of the terminal, and the sequence associated with the usage timing of the running application at least indicates an application running prior to the running application;
   inputting the current usage information to a model used for application prediction, the model used for application prediction comprising a hybrid network model generated according to a usage rule of applications of the terminal corresponding to historical status feature information of the terminal;
   predicting at least one target application to be launched according to an output result of the model used for application prediction;
   preloading the at least one target application;
   forming the hybrid network model based on a fully connected relation between an output layer of a recurrent-neural-network submodel and an output layer of a fully connected network submodel;
   collecting historical sample usage information of the terminal during a preset period, the historical sample usage information comprising a sequence associated with historical usage timing of at least two applications of the terminal, and historical status feature information of the terminal corresponding to a time point of launching each of the at least two applications; and
   inputting the sequence associated with the historical usage timing of the at least two applications to the recurrent-neural-network submodel, and inputting the historical status feature information to the fully connected network submodel, so as to train the hybrid network model to acquire the model used for application prediction.

2. The method of claim 1, further comprising:
   inputting the sequence associated with the usage timing of the running application to the recurrent-neural-network submodel, and inputting the current status feature information of the terminal to the fully connected network submodel.

3. The method of claim 1, wherein preloading the at least one target application comprises:
   creating an active window for preloading, the active window stack for preloading having boundary coordinates locating outside a coordinate range of a display screen of the terminal; and
   preloading an application interface of the at least one target application according to the active window stack for preloading.

4. The method of claim 1, further comprising:
   determining whether an operation of opening a preset code path corresponding to a running application is detected; and
   pausing preloading the at least one target application in response to that the operation of opening the preset code path is detected.

5. The method of claim 1, wherein preloading the at least one target application comprises one of the following:
   acquiring a central processing unit (CPU) usage rate of the terminal, and preloading the at least one target application when the CPU usage rate is lower than a preset usage rate threshold; and
   acquiring a value of remaining storage space of the terminal, and preloading the at least one target application when the value of the remaining storage space is larger than a preset storage threshold.

6. The method of claim 1, wherein the status feature information comprises at least one of the following:
   time information, date category, on and off status of a mobile data network, wireless hotspot connection status, identity information of a connected wireless hotspot, duration of that the current application stays in the background, time of last switch of the current application to the background, plugging and unplugging status of an earphone jack, charging status, power information of a battery, display duration of a screen, motion status of the terminal, and location information of the terminal.

7. A terminal, comprising:
   at least one processor; and
   a computer readable memory, coupled to the at least one processor and storing at least one computer executable instruction therein, the at least one computer executable instruction being executed by the at least one processor to cause the at least one processor to carry out actions, comprising:
   acquiring, in response to detecting that an event of prediction of preloading an application is triggered, current usage information of the terminal, wherein the current usage information comprises a sequence associated with usage timing of a running application of the terminal and current status feature information of the terminal, and the sequence associated with the usage timing of the running application at least indicates an application running prior to the running application;
   inputting the current usage information to a model used for application prediction, the model used for application prediction comprising a hybrid network model generated according to a usage rule of applications of the terminal corresponding to historical status feature information of the terminal;

predicting at least one target application to be launched according to an output result of the model used for application prediction;

preloading the at least one target application;

forming the hybrid network model based on a fully connected relation between an output layer of a recurrent-neural-network submodel and an output layer of a fully connected network submodel;

collecting historical sample usage information of the terminal during a preset period, the historical sample usage information comprising a sequence associated with historical usage timing of at least two applications of the terminal, and historical status feature information of the terminal corresponding to a time point of launching each of the at least two applications; and inputting the sequence associated with the historical usage timing of the at least two applications to the recurrent-neural-network submodel, and inputting the historical status feature information to the fully connected network submodel, so as to train the hybrid network model to acquire the model used for application prediction.

8. The terminal of claim 7, wherein the at least one processor is further caused to carry out actions, comprising:

inputting the sequence associated with the usage timing of the running application to the recurrent-neural-network submodel, and inputting the current status feature information of the terminal to the fully connected network submodel.

9. The terminal of claim 7, wherein the at least one processor carrying out the action of preloading the at least one target application is caused to carry out an action, comprising:

creating an active window stack for preloading, the active window stack for preloading having boundary coordinates locating outside a coordinate range of a display screen of the terminal; and preloading an application interface of the at least one target application according to the active window stack for preloading.

10. The terminal of claim 7, wherein the at least one processor is further caused to carry out actions, comprising:

determining whether an operation of opening a preset code path corresponding to a running application is detected; and pausing preloading the at least one target application in response to that the operation of opening the preset code path is detected.

11. The terminal of claim 7, wherein the at least one processor carrying out the action of preloading the at least one target application is caused to carry out one of the following:

acquiring a central processing unit (CPU) usage rate of the terminal, and preloading the at least one target application when the CPU usage rate is lower than a preset usage rate threshold; and acquiring a value of remaining storage space of the terminal, and preloading the at least one target application when the value of the remaining storage space is larger than a preset storage threshold.

12. A non-transitory computer-readable storage medium storing at least one computer-executable instruction, the at least one computer-executable instruction being executed by at least one processor to cause the at least one processor to carry out actions, comprising:

acquiring, in response to detecting that an event of prediction of preloading an application is triggered, current usage information of a terminal, wherein the current usage information comprises a sequence associated with usage timing of a running application of the terminal and current status feature information of the terminal, and the sequence associated with the usage timing of the running application at least indicates an application running prior to the running application;

inputting the current usage information to a model used for application prediction, the model used for application prediction comprising a hybrid network model generated according to a usage rule of applications of the terminal corresponding to historical status feature information of the terminal;

predicting at least one target application to be launched according to an output result of the model used for application prediction;

preloading the at least one target application;

forming the hybrid network model based on a fully connected relation between an output layer of a recurrent-neural-network submodel and an output layer of a fully connected network submodel;

collecting historical sample usage information of the terminal during a preset period, the historical sample usage information comprising a sequence associated with historical usage timing of at least two applications of the terminal, and historical status feature information of the terminal corresponding to a time point of launching each of the at least two applications; and inputting the sequence associated with the historical usage timing of the at least two applications to the recurrent-neural-network submodel, and inputting the historical status feature information to the fully connected network submodel, so as to train the hybrid network model to acquire the model used for application prediction.

13. The non-transitory computer-readable storage medium of claim 12, wherein the at least one computer-executable instruction is further executed by the at least one processor to carry out an action, comprising:

inputting the sequence associated with the usage timing of the running application to the recurrent-neural-network submodel, and inputting the current status feature information of the terminal to the fully connected network submodel.

14. The non-transitory computer-readable storage medium of claim 12, wherein the at least one computer-executable instruction is further executed by the at least one processor to carry out actions, comprising:

creating an active window for preloading, the active window stack for preloading having boundary coordinates locating outside a coordinate range of a display screen of the terminal; and preloading an application interface of the at least one target application according to the active window stack for preloading.

15. The non-transitory computer-readable storage medium of claim 12, wherein the at least one computer-executable instruction is further executed by the at least one processor to carry out actions, comprising:

determining whether an operation of opening a preset code path corresponding to a running application is detected; and pausing preloading the at least one target application in response to that the operation of opening the preset code path is detected.

16. The non-transitory computer-readable storage medium of claim 12, wherein the at least one computer-executable instruction being executed by the at least one processor to carry out the action of preloading the at least one target application is executed by the at least one processor to carry out one of the following:

acquiring a central processing unit (CPU) usage rate of the terminal, and preloading the at least one target application when the CPU usage rate is lower than a preset usage rate threshold; and acquiring a value of remaining storage space of the terminal, and preloading the at least one target application when the value of the remaining storage space is larger than a preset storage threshold.

17. The non-transitory computer-readable storage medium of claim 12, wherein the status feature information comprises at least one of the following:

time information, date category, on and off status of a mobile data network, wireless hotspot connection status, identity information of a connected wireless hotspot, duration of that the current application stays in the background, time of last switch of the current application to the background, plugging and unplugging status of an earphone jack, charging status, power information of a battery, display duration of a screen, motion status of the terminal, and location information of the terminal.

\* \* \* \* \*